United States Patent [19]

Kitami et al.

[11] Patent Number: 4,905,736
[45] Date of Patent: Mar. 6, 1990

[54] HOSE CONSTRUCTION

[75] Inventors: Tetsu Kitami, Hadano; Jun Mito, Kanagawa; Toyotaka Narita, Hiratsuka, all of Japan

[73] Assignee: Yokohama Rubber Co., Ltd., Tokyo, Japan

[21] Appl. No.: 200,973

[22] Filed: Jun. 1, 1988

[30] Foreign Application Priority Data

Jun. 1, 1987 [JP] Japan .................................. 62-134917
Jun. 1, 1987 [JP] Japan .................................. 62-134918

[51] Int. Cl.⁴ .............................................. F16L 9/16
[52] U.S. Cl. ..................................... 138/137; 138/125; 138/109
[58] Field of Search ............... 138/118, 123, 124, 125, 138/126, 137, 109

[56] References Cited
U.S. PATENT DOCUMENTS

| | | | |
|---|---|---|---|
| 4,510,974 | 4/1985 | Natori et al. ........................ | 138/137 |
| 4,603,712 | 8/1986 | Krause ................................. | 138/137 |
| 4,613,532 | 9/1986 | Michel et al. ....................... | 138/118 |
| 4,633,912 | 1/1987 | Pilkington et al. ................. | 138/137 |
| 4,657,285 | 4/1987 | Akiyoma et al. ................... | 138/137 |

*Primary Examiner*—James E. Bryant, III
*Attorney, Agent, or Firm*—Finnegan, Henderson, Farabow, Garrett, Dunner

[57] ABSTRACT

Hoses for transporting or otherwise handling refrigerant and oil fluids are disclosed which are comprised of an inner tube, an outer cover and a reinforcing layer interposed therebetween. The inner tube includes at least two walls, one being an inner resinous wall and the other being an outer rubbery wall having specified moduli at 100%. The outer cover is formed by a selected class of rubbers having a higher modulus at 100% than the outer wall of the inner tube. The resulting hose is securely interconnectable with metal fittings, highly impermeable to gaseous and oily fluids, sufficiently resistant to stress cracking and adequately flexible.

6 Claims, 1 Drawing Sheet

HOSE CONSTRUCTION

BACKGROUND OF THE INVENTION

1. Field of the Invention

This invention relates to hoses suitable for use in transporting or otherwise handling refrigerant and oils fluids.

2. Prior Art

Known hoses of this type are comprised of an inner tube and an outer cover, the inner tube being of a two-layered structure having a thermoplastic, resinous wall and a rubbery wall so as to improve impermeation to gaseous and oily fluids. An inner wall of the hose is usually formed by a thermoplastic material having regard to chemical and heat resistance.

In this prior construction, however, the inner tube is difficult to tightly interconnect with a metal fitting under clamping force because the inner resinous wall of the tube is great in modulus, generally about 10 to 500 times the outer cover and the outer wall. Excessive clamping would deform or eventually impair the outer cover and even the outer wall, leading to hazardous leakage of a refrigerant or oil at from the hose portion so affected. Insufficient clamping would make the hose ready to slip out of the metal fitting and hence susceptible to cutting. To cope with the foregoing problems, it has been proposed to apply an adhesive or a rubber coating onto the fitting. This is literally tedious but with little success.

Certain resins are known in common use as materials for the inner tube, and they include nylon-6, a copolymer of nylon-6 and nylon-66 (nylon-6-66), nylon-11 and nylon-12. Nylon-6 and nylon-6-66 have been found satisfactory with respect to gas impermeation but susceptible to stress cracking and rigidity, while nylon-11 and nylon-12 are not sufficiently impermeable to gas.

It has also been found that if pin holes or minute scars occur on an inner resinous wall of the inner tube during tube processing as by extrusion molding or during fabrication of the hose, then they tend to grow into cracks due to repeated compression of the hose in service, or into stress cracks particularly on contact with metal chlorides such as zinc chloride. This type of cracking would in most instances extend to and break an outer rubbery wall as is usually called crack propagation and thus leak a fluid in transit, resulting in bursted hose and hence reduced service life.

SUMMARY OF THE INVENTION

It is therefore the primary object of the present invention to provide an improved hose which excels in attachment to metal fittings, impermeation to gaseous and oily fluids, and flexibility and has freedom from crack propagation, thus ensuring safe and reliable piping work.

Many other objects and advantages of the invention will be better understood from the following description taken in connection with the accompanying drawings in which a preferred embodiment of the invention is shown for illustrative purposes.

According to the invention, there is provided a hose comprising an inner tube, a reinforcing layer and an outer cover superimposed one on another, the inner tube including at least two walls, one being an inner resinous wall formed by a polyamide resin and the other being an outer rubbery wall having a 100% modulus of 15 to 40 kgf/cm$^2$, and the outer cover having a 100% modulus of 20 to 50 kgf/cm$^2$.

DETAILED DESCRIPTION OF THE INVENTION

Figure 1:
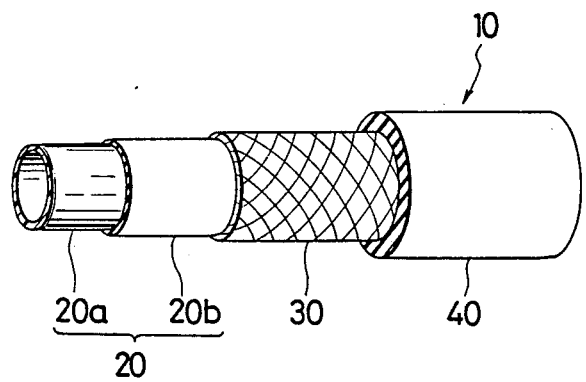
FIG. 1 is a segmentary perspective view, partly broken, of the hose embodying the present invention.

A hose, constructed in accordance with the present invention and shown at 10 in FIG. 1, comprises an inner tube 20, an outer cover 40 and a layer of reinforcement 30 interposed therebetween. The inner tube 20 includes at least two walls, one of which is an inner wall 20a formed by a selected class of polyamide resins and disposed for direct contact with gaseous fluids such as refrigerants, and oily fluids such as gasoline, light gas oil, lubricating oil, hydraulic oil and the like. The other wall is an outer wall 20b formed by a selected class of rubbers and laminated over the inner wall 20a.

Polyamide resins useful for the purpose of the invention include for example nylon-6, nylon-11, nylon-12, nylon-6-66, a blend of nylon-6, nylon-11 and a polyolefin (nylon-6/nylon-11/polyolefin) and the like. Ternary blends are preferably composed of 40 to 80 parts by weight of nylon-6, 5 to 30 parts by weight of nylon-11 and 10 to 40 parts by weight of a polyolefin. The polyolefin may suitably be selected from polyethylene, polypropylene and an ethylene/propylene copolymer.

As used herein, the following terms have the meaning respectively set for the below:

(1) the term nylon 6 refers to polycaprolactam, which can be prepared by thermal polymerization of epsilon-aminocaproic acid;

(2) nylon 11 refers to polyaminoundecanamide, which is the self-condensation product of 11-amino aminoundecanoic acid;

(3) nylon 6/66 refers to a copolymer of nylon 6 and nylon 66. Nylon 66 refers to polyhexamethylene adipamide, which can be prepared by the condensation of hexamethylene diamine and adipic acid; and (4) nylon 12 refers to polydodecanolactam, which is the self-condensation product of laurolactam.

The inner wall 20a has a thickness of 0.05 to 0.80 mm, preferably 0.08 to 0.50 mm, and 5 to 25%, preferably 5 to 10%, of the total thickness of the inner tube 20.

Figure 2:
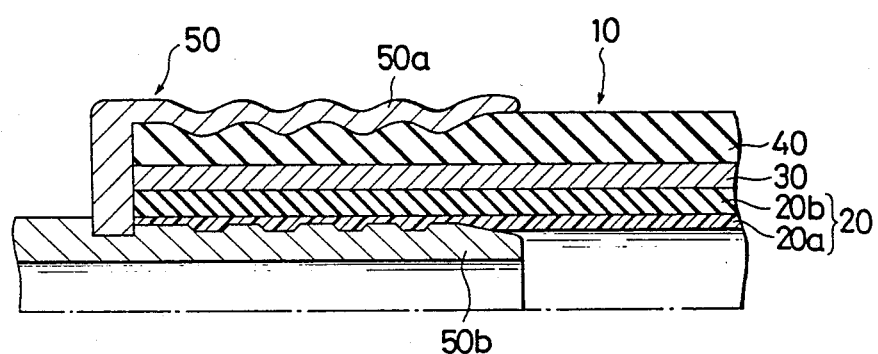
FIG. 2 is a partial cross-sectional view of the hose with a metal fitting assembled.

Importantly, the outer wall 20b should have a modulus at 100% in the range of 15 to 40 kgf/cm$^2$. Smaller moduli would render the outer wall 20b too deformable on clamping, leading to bulging at the end of a metal fitting 50 made up of a socket 50a and a nipple 50b as seen in FIG. 2. Greater moduli would not be effective in pressing the outer wall 20b in an extent to give adequate strain with the result that the inner wall 20a fails to make an exact fit to the inside recesses of the fitting 50 and thus leaves therebetween a clearance from which a fluid readily leaks.

Suitable rubbers for use in the outer wall 20b include for example flexibility-imparting rubbers such as acrylonitrile/butadiene copolymer rubber (NBR), chlorosulfonated polyethylene (CSM), ethylene/propylene/diene terpolymer rubber (EPDM), butyl rubber (IIR), chlorinated butyl rubber (Cl-IIR), brominated butyl rubber (Br-IIR), epichlorohydrin rubber (CHR and CHC), acrylic rubber (ACM), chloroprene rubber (CR) and the like. Particularly preferred are IIR, Cl-IIR, Br-IIR, CSM, EPDM, CHR and CHC as they are highly impermeable to moisture.

The outer wall 20b ranges in thickness from 0.5 to 3 mm.

The outer cover 40 should be formed by a selected class of rubbers having a modulus at 100% of 20 to 50 kgf/cm². Further importantly, the 100% modulus of the outer cover 40 should be higher up to 20 kgf/cm² than that of the outer rubbery wall 20b. Departures from this range would fail to produce adequate strain on the outer wall 20b and also on the inner wall 20a, causing similar problems noted in connection with the outer wall 20b.

Specific examples of the rubbers of such higher moduli include ethylene/propylene/diene terpolymer rubber (EPDM), chloroprene rubber (CSM), epichlorohydrin rubber (CHR and CHC), butyl rubber (IIR), chlorinated butyl rubber (Cl-IIR), brominated butyl rubber (Br-IIR) and the like.

The thickness of the outer cover 40 is between 0.5 and 3 mm.

To attain improved resistance to crack propagation which would arise out of pin holes or scars on the inner resinous wall, the outer wall of the inner tube should importantly have a 100% modulus of 15 to 40 kgf/cm² and a tear strength of not less than 15 kgf/cm², preferably 15 to 50 kgf/cm², at 120° C. at which to use the hose according to the invention. To this end, butyl rubber (IIR), chlorinated butyl rubber (Cl-IIR), brominated butyl rubber (Br-IIR) and the like are preferred. Suitable bonding adhesives may be applied, where desired, onto and inbetween the inner and outer walls of the inner tube, thereby rendering the resulting hose mechanically strong and durable.

No particular restriction is imposed upon the reinforcing layer 30. This layer may conveniently be formed for instance by braiding rayon, polyester or the like.

The hose according to the invention may be fabricated by any suitable known methods. On such method involves passing a release-treatd mandrel through an extruder equipped with a head from which a resin is extruded peripherally on the mandrel and thus forms an inner plastic tube. The tube-carrying mandrel is allowed to successively enter a rubber extruder at which time an outer wall of rubbery material is laminated over the plastic tube to thereby form an outer rubbery tube. To facilitate bonding between the plastic and rubbery walls, it is convenient to coat the plastic tube as by spraying with a chlorinated rubber, phenolic resin or HRH (silica-resorcinol donor-methylene donor) adhesive.

A layer of reinforcement is laminated by braiding suitable textile yarns over the outer rubbery wall of the core tube. An outer cover is disposed outwardly about the braided layer by extrusion of a predetermined rubbery material.

The resulting hose body is vulcanized under pressure at 130° to 170° C., preferably 140° to 160° C., and subsequently cooled. The mandrel is afterwards pulled out of the vulcanized hose body, whereby a desired hose product is obtained.

The following examples are given to further illustrate the invention.

EXAMPLES 1-9 AND COMPARATIVE EXAMPLES 1-6

Different hoses were prepared according to the formulation shown in Table 1. The hoses representing the invention had an outer cover formed by butyl rubber-1 (IIR-1) having a 100% modulus (M-100) of 35 kgf/cm² or by chloroprene (CR) of 43 kgf/cm². Butyl rubber-2 (IIR-2) of 21 kgf/cm², chlorosulfonated polyethylene rubber (CSM) of 27 kgf/cm² and chlorinated butyl rubber (Cl-IIR) of 24 kgf/cm² were used as the outer covers in the comparative hoses. A rayon braid of reinforcement was employed all the test hoses.

Metal fitting attachment of the hoses was examined under the conditions given below and with the results shown in Table 1.

| IIR-1 | |
|---|---|
| IIR (Exxon Butyl 268, Esso Chemical Co.) | 100 |
| carbon black (Show Black N220, Showa Cabot Co.) | 65 |
| AC polyethylene | 7 |
| stearic acid | 3 |
| antioxidant (Antage OD, Kawaguchi Kagaku Co.) | 2 |
| zinc oxide | 5 |
| brominated phenol resin (Tackiroll 250-1, Taoka Kagaku Kogyo Co.) | 12 |
| IIR-2 | |
| IIR (Exxon Butyl 268, Esso Chemical Co.) | 100 |
| carbon black (Show Black N220, Showa Cabot Co.) | 65 |
| AC polyethylene | 7 |
| stearic acid | 3 |
| antioxidant (Antage OD, Kawaguchi Kagaku Co.) | 2 |
| softener (Machine Oil 22, Fuji Kosan Co.) | 8 |
| zinc oxide | 3 |
| brominated phenol resin (Tackiroll 250-1, Taoka Kagaku Kogyo Co.) | 12 |
| Cl-IIR | |
| Cl-IIR (Chlorobutyl 1066, Esso Chemical Co.) | 100 |
| carbon black (Show Black N220, Showa Cabot Co.) | 60 |
| AC polyethylene | 7 |
| stearic acid | 2 |
| magnesium oxide | 1 |
| antioxidant (Antage OD, Kawaguchi Kagaku Co.) | 2 |
| softener (Machine Oil 22, Fuji Kosan Co.) | 5 |
| accelerator TT (Sunceller TT, Sanshin Kagaku Kogyo Co.) | 2 |
| accelerator R (Actor MS-R, Kawaguchi Kagaku Co.) | 2 |
| NBR-1 | |
| NBR (Nipol 1042, Nippon Zeon Co.) | 100 |
| carbon black (Asahi 50, Asahi Carbon Co.) | 80 |
| stearic acid | 2 |
| zinc oxide | 5 |
| antioxidant (Antage OD, Kawaguchi Kagaku Co.) | 2 |
| plasticizer (DOP, Chisso Chemical Co.) | 10 |
| sulfur | 2 |
| accelerator TS (Sunceller MS, Sanshin Kagaku Kogyo Co.) | 1 |
| CSM | |
| CSM (Hypalon 40, Dupont) | 100 |
| carbon black (Asahi 50, Asahi Carbon Co.) | 60 |
| paraffin wax (Sunnoc, Ohuchi Shinko Kagaku Co.) | 1.5 |
| magnesium oxide | 4 |
| stearic acid | 1 |
| softener (Fuccol 1000, Fuji Kosan Co.) | 30 |
| pentaerythritol (Noylizer P, Nippon Kagaku Kogyo Co.) | 3 |
| accelerator TRA (Sunceller TRA, Sanshin Kagaku Kogyo Co.) | 2 |
| CR | |
| CR (Neoprene W, Showa Neoprene Co.) | 100 |
| carbon black (Asahi 50, Asahi Carbon Co.) | 100 |
| magnesium oxide | 4 |
| stearic acid | 3 |

-continued

| | |
|---|---|
| antioxidant (Ozonon 3C, Seiko Kagaku Co.) | 3 |
| softener (Fuccol 1150N, Fuji Kosan Co.) | 10 |
| sulfur | 1 |
| accelerator TS (Sunceller TS, Sanshin Kagaku Kogyo Co.) | 1 |
| accelerator D (Sunceller D, Sanshin Kagaku Kogyo Co.) | 1 |
| zinc oxide | 5 |

METAL FITTING ATTACHMENT

As shown in FIG. 2, a hose was interconnected with a socket-nipple metal fitting with the outer cover abutted against the socket and with the inner wall of the inner tube abutted against the nipple. The metal fitting was clamped at a clamping ratio of 30 to 50%, followed by aging of the hose in an aerial atmosphere at 120° C. for 168 hours and by subsequent charging with nitriogen gas at 30 kgf/cm². Metal fitting attachment was determined by gas leakage (airtightness) on lapse of 5 minutes after gas charging.

EXAMPLES 10-17 AND COMPARATIVE EXAMPLES 7-12

Different hoses were formulated and prepared as shown in Table 2. Performance test was made for crack propagation, flon gas permeation and flexibility under the conditions given below and with the results shown in Table 2.

| IIR-3 | |
|---|---|
| IIR (Exxon Butyl 268, Esso Chemical Co.) | 100 |
| carbon black HAF (Show Black N330T, Showa Cabot Co.) | 80 |
| AC polyethylene | 7 |
| stearic acid | 3 |
| zinc oxide | 5 |
| softener (Machine Oil 22, Fuji Kosan Co.) | 10 |
| brominated phenol resin (Tackiroll 250-1, Taoka Kagaku Kogyo Co.) | 10 |
| IIR-4 | |
| Br-IIR (Promobutyl X-2, Polycer Co.) | 100 |
| carbon black (Show Black N330T, Showa Cabot Co.) | 40 |
| white carbon (Nipseal AQ, Nippon Silica Industries Co.) | 40 |
| stearic acid | 1 |
| phenol resin (Tackiroll 101, Taoka Kagaku Kogyo Co.) | 2 |
| AC polyethylene | 2 |
| softener (Machine Oil 22, Fuji Kosan Co.) | 10 |
| zinc oxide | 5 |
| accelerator Na22 (Sunceller 22, Sanshin Kagaku Kogyo Co.) | 1.5 |
| DT (Soccinol DT, Sumitomo Chemical Co.) | 2 |
| lithage (Litage Yellow No. 1) | 4 |
| IIR-5 | |
| Br-IIR (Promobutyl X-2, Polycer Co.) | 100 |
| carbon black FEP (Show Black N330, Showa Cabot Co.) | 65 |
| stearic acid | 3 |
| softener (Machine Oil 22, Fuji Kosan Co.) | 10 |
| zinc oxide | 5 |
| accelerator | |

-continued

| | |
|---|---|
| Na22 (Sunceller 22, Sanshin Kagaku Kogyo Co.) | 1.5 |
| DT (Soccinol DT, Sumitomo Chemical Co.) | 2 |
| magnesium oxide | 1 |
| NBR-2 | |
| NBR (Nipol 1042, Nippon Zeon Co.) | 100 |
| carbon black (Asahi 50, Asahi Carbon Co.) | 80 |
| zinc oxide | 5 |
| stearic acid | 1 |
| antioxidant (Antage OD, Kawaguchi Kagaku Co.) | 1 |
| plasticizer (DOP, Chisso Chemical Co.) | 10 |
| sulfur | 2 |
| accelerator TS (Sunceller MSPO, Sanshin Kagaku Kogyo Co.) | 1 |
| NBR-3 | |
| NBR (Nipol 1042, Nippon Zeon Co.) | 100 |
| carbon black (Asahi 50, Asahi Carbon Co.) | 70 |
| white carbon (Nipseal AQ, Nippon Silica Co.) | 20 |
| zinc oxide | 5 |
| stearic acid | 1 |
| antioxidant (Antage OD, Kawaguchi Kagaku Co.) | 1 |
| plasticizer (DOP, Chisso Chemical Co.) | 15 |
| sulfur | 2 |
| accelerator TS (Sunceller MSPO, Sanshin Kagaku Kogyo Co.) | 1 |

CRACK PROPAGATION

An inner resinous wall of the inner tube of a hose was cut to a length of 1 mm by knife and secured onto an impulse tester, followed by filling of the hose with hydraulic oil (Autoloop SAE 30). The hose was exposed to repeated stress at an oil temperature of 120° C. and at a pressure of 30 kgf/cm² (rectangular wave 100%) for a total cycle of 300,000 runs. When crack propagation took place, resulting in cracked outer wall of the inner tube and eventually bursted hose prior to the total cycle of runs, the number of impulses was counted. In the case of no bursting even after the total run, crack propagation was adjudged by cracking on the outer wall of the inner tube.

FREON GAS PERMEATION (FREON: DUPONT'S TRADEMARK)

JRA 2001 of the Japan Refrigerating and Air-Conditioning Association was followed. A 45 cm long test hose having a metal fitting was charged with a refrigerant (Freon R-12) in an amount of 0.6±0.1 g per cubic centimeter, followed by disposition at 100° C. for 96 hours. Gas permeation resistance was determined by gas leak after a lapse of from 24 to 96 hours and indicated in terms of g/m/72 hr.

FLEXIBILITY

A test hose was arcutely bent at a bend radius of 10 times its outer diameter, followed by measurement of bending stresses (n=2) ranging in bend radius from 10 to 3 times. Flexibility was determined by bending strength (kgt) read at a bend radius of 4 times from the stress-radius curve.

TABLE 1

| | Example | | | | | | | | |
|---|---|---|---|---|---|---|---|---|---|
| Hose | 1 | 2 | 3 | 4 | 5 | 6 | 7 | 8 | 9 |
| inner wall | | | | | | | | | |

TABLE 1-continued

| | | | | | | | | | |
|---|---|---|---|---|---|---|---|---|---|
| resin | N-6 | N-11 | | | | blend | | | |
| thickness (mm) | 0.15 | 0.15 | 0.15 | 0.15 | 0.15 | 0.15 | 0.35 | 0.15 | 0.15 |
| outer wall | | | | | | | | | |
| rubber | IIR-2 | Cl-IIR | IIR-2 | Cl-IIR | NBR-1 | CSM | IIR-2 | Cl-IIR | Cl-IIR |
| M-100 (kgf/cm²) | 21 | 24 | 21 | 24 | 27 | 27 | 21 | 24 | 24 |
| thickness (mm) | 1.85 | 1.85 | 1.85 | 1.85 | 1.85 | 1.85 | 1.65 | 1.85 | 1.85 |
| outer cover | | | | | | | | | |
| rubber | IIR-1 | IIR-1 | IIR-1 | IIR-1 | IIR-1 | IIR-1 | CR | IIR | IIR |
| M-100 (kgf/cm²) | 35 | 35 | 35 | 35 | 35 | 35 | 43 | 35 | 35 |
| thickness (mm) | 2 | 2 | 2 | 2 | 2 | 2 | 2 | 2 | 2 |
| attachment to metal fitting | | | | | | | | | |
| clamping ratio (%) | 40 | 40 | 40 | 40 | 40 | 40 | 40 | 35 | 45 |
| airtightness | o | o | o | o | o | o | o | o | o |
| bulging | — | — | — | — | — | — | — | — | — |

| | Comparative Examples | | | | | |
|---|---|---|---|---|---|---|
| Hose | 1 | 2 | 3 | 4 | 5 | 6 |
| inner wall | | | | | | |
| resin | N-6 | N-11 | | | blend | |
| thickness (mm) | 0.15 | 0.15 | 0.15 | 0.15 | 0.15 | 0.35 |
| outer wall | | | | | | |
| rubber | IIR-1 | IIR-1 | IIR-1 | IIR-1 | CR | CR |
| M-100 (kgf/cm²) | 35 | 35 | 35 | 35 | 43 | 43 |
| thickness (mm) | 1.85 | 1.85 | 1.85 | 1.85 | 1.85 | 1.65 |
| outer cover | | | | | | |
| rubber | IIR-2 | IIR-2 | IIR-2 | CSM | Cl-IIR | Cl-IIR |
| M-100 (kgf/cm²) | 21 | 21 | 21 | 27 | 24 | 24 |
| thickness (mm) | 2 | 2 | 2 | 2 | 2 | 2 |
| attachment to metal fitting | | | | | | |
| clamping ratio (%) | 40 | 40 | 40 | 40 | 36 | 40 |
| airtightness | x | x | x | x | x | x |
| bulging | | | | | | |

N-6: nylon-6, CM 1041, Toray Industries, Inc.
N-11: nylon-11, BESNO TL, Atochem Co.
blend: N-6/N-11/polyolefin = 59.6/27.5/14.9
o: not leaked
x: leaked
—: not bulged

TABLE 2

| | Comparative Examples | | | | |
|---|---|---|---|---|---|
| Hose | 7 | 8 | 9 | 10 | 11 |
| inner wall resin | N-11 | N-11 | N-11 | N-6 | blend |
| thickness (mm) | 0.5 | 0.2 | 0.5 | 0.2 | 0.2 |
| outer wall rubber | NBR-2 | NBR-2 | NBR-3 | NBR-3 | NBR-2 |
| tear strength (kgf/cm²) | 8 | 8 | 10 | 10 | 8 |
| outer wall thickness (mm) | 1.5 | 1.8 | 1.5 | 1.5 | 1.8 |
| crack propagation | x | x | x | x | x |
| impulse | 750 | 680 | 780 | 650 | 720 |
| Freon permeability (g/m/72 hr) | 8.3 | 9.3 | 8.3 | 1.0 | 1.9 |
| flexibility (kgf) | 2.15 | 2.13 | 2.15 | 2.2 | 1.7 |

| | Examples | | | | | | | | Comparative Example |
|---|---|---|---|---|---|---|---|---|---|
| Hose | 10 | 11 | 12 | 13 | 14 | 15 | 16 | 17 | 12 |
| inner wall resin | N-11 | blend | blend | blend | blend | N-6 | N-6 | blend | blend |
| thickness (mm) | 0.35 | 0.05 | 0.1 | 0.2 | 0.5 | 0.5 | 0.2 | 0.2 | 0.2 |
| outer wall rubber | IIR-3 | IIR-3 | IIR-3 | IIR-3 | IIR-3 | IIR-4 | IIR-4 | IIR-4 | IIR-5 |
| tear strength (kgf/cm²) | 39 | 39 | 39 | 39 | 39 | 39 | 19 | 19 | 9 |
| outer wall thickness (mm) | 1.65 | 1.95 | 1.9 | 1.8 | 1.5 | 1.5 | 1.5 | 1.8 | 1.8 |
| crack propagation | o | o | o | o | o | o | o | o | x |
| impulse | | | | 300,000> | | | | | 650 |
| Freon permeability (g/m/72 hr) | 9.8 | 3.7 | 3.0 | 2.3 | 1.6 | 1.6 | 2.3 | | 2.3 |
| flexibility (kgf) | 2.0 | 1.47 | 1.54 | 1.60 | 1.73 | 2.35 | 2.30 | 1.61 | 1.65 |

N-6, N-11, blend: see footnote to Table 1
o: not propagated
x: propagated

What is claimed is:

1. A hose comprising an inner tube, a reinforcing layer and an outer cover superimposed one on another, said inner tube including at least two walls, one being an inner resinous wall formed by a polyamide resin and the other being an outer rubbery wall having a 100% modulus of 15 to 40 kgf/cm$^2$, said outer cover having a 100% modulus higher than that of said outer rubbery wall and in the range of 20 to 50 kgf/cm$^2$.

2. The hose according to claim 1, said outer wall having a 100% modulus of 15 to 40 kgf/cm$^2$ and a tear strength of not less than 15 kgf/cm.

3. The hose according to claim 1, said inner wall being formed by nylon-6, nylon-11, nylon-12, nylon-6/66 or nylon6/nylon-11/polyolefin.

4. The hose according to claim 1, said outer wall being formed by acrylonitrile/butadiene rubber, chlorosulfonated polyethylene rubber, ethylene/propylene/diene rubber, butyl rubber, chlorinated butyl rubber, brominated butyl rubber, epichlorohydrin rubber, butyl rubber, chlorinated butyl rubber or brominated butyl rubber.

5. The hose according to claim 1, said outer cover being formed by ethylene/propyrene/diene rubber, chlorosulfonated polyethylene rubber, epichlorohydrin rubber, butyl rubber, chlorinated butyl rubber or brominated butyl rubber.

6. The hose of claim 1, wherein the 100% modulus of said outer cover is up to 20 kgf/cm$^2$ higher than the 100% modulus of said outer rubbery wall.

* * * * *